United States Patent
Heinrichsdorff et al.

(10) Patent No.: US 11,389,868 B2
(45) Date of Patent: Jul. 19, 2022

(54) POWDER-BED-BASED ADDITIVE MANUFACTURING PROCESS

(71) Applicant: Siemens Energy Global GmbH & Co. KG, Munich (DE)

(72) Inventors: Frank Heinrichsdorff, Teltow (DE); Ralph Reiche, Berlin (DE); Daniel Reznik, Berlin (DE); Oliver Stier, Berlin (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 725 days.

(21) Appl. No.: 15/560,687

(22) PCT Filed: Mar. 10, 2016

(86) PCT No.: PCT/EP2016/055146
§ 371 (c)(1),
(2) Date: Sep. 22, 2017

(87) PCT Pub. No.: WO2016/150720
PCT Pub. Date: Sep. 29, 2016

(65) Prior Publication Data
US 2018/0104741 A1     Apr. 19, 2018

(30) Foreign Application Priority Data
Mar. 24, 2015   (DE) .................... 10 2015 205 316.4

(51) Int. Cl.
*B22F 1/16* (2022.01)
*B22F 10/20* (2021.01)
(Continued)

(52) U.S. Cl.
CPC ................ *B22F 1/16* (2022.01); *B22F 10/20* (2021.01); *B22F 5/04* (2013.01); *B33Y 10/00* (2014.12); *B33Y 70/00* (2014.12); *Y02P 10/25* (2015.11)

(58) Field of Classification Search
CPC ................................ B22F 1/02; B22F 3/1055
See application file for complete search history.

(56) References Cited

U.S. PATENT DOCUMENTS

| | | | | |
|---|---|---|---|---|
| 4,769,087 A | * | 9/1988 | Genereux | ................ C22F 1/10 148/677 |
| 5,645,893 A | * | 7/1997 | Rickerby | .............. C23C 14/083 427/405 |

(Continued)

FOREIGN PATENT DOCUMENTS

| | | | | |
|---|---|---|---|---|
| CN | 103521768 A | 1/2014 | ............. | B22F 3/105 |
| EP | 1355760 B1 | 5/2005 | ............. | B22F 3/105 |

(Continued)

OTHER PUBLICATIONS

Ming, Vin Ree. The effect of solution heat treatment on the tensile and creep properties of MarM-002. Diss. University of Cape Town, 1995 (Year: 1995).*

(Continued)

*Primary Examiner* — Anthony J Zimmer
*Assistant Examiner* — Ricardo D Morales
(74) *Attorney, Agent, or Firm* — Slayden Grubert Beard PLLC

(57) ABSTRACT

The present disclosure relates to powder-bed-based additive manufacturing processes. Embodiments thereof may include methods for producing a component from a superalloy. For example, a method for producing a component comprising a superalloy may include: preheating a powder bed comprising particles of a core material coated by a ceramic layer, the core material including alloying constituents of the (Continued)

superalloy and building up the component layer by layer in a powder bed by melting particles with an energy beam. The powder bed may be heated to a temperature below a melting point of the core material before the particles are melted.

10 Claims, 2 Drawing Sheets

(51) Int. Cl.
    *B22F 5/04*     (2006.01)
    *B33Y 10/00*     (2015.01)
    *B33Y 70/00*     (2020.01)

(56) References Cited

U.S. PATENT DOCUMENTS

| | | | |
|---|---|---|---|
| 7,413,798 B2 * | 8/2008 | Burns | C23C 14/024 428/325 |
| 2004/0056022 A1 | 3/2004 | Meiners et al. | 219/634 |
| 2009/0047439 A1 | 2/2009 | Withers et al. | 427/448 |
| 2015/0321255 A1 * | 11/2015 | Colin | B22F 3/1055 419/55 |
| 2016/0175929 A1 | 6/2016 | Colin et al. | 419/23 |

FOREIGN PATENT DOCUMENTS

| | | | |
|---|---|---|---|
| WO | 2015/001241 A2 | 1/2015 | ............ B22F 1/0014 |
| WO | 2016/150720 A1 | 9/2016 | ................ B22F 1/02 |

OTHER PUBLICATIONS

Hagedorn et al. "Processing of nickel based superalloy MAR M-247 by means of High Temperature-Selective Laser Melting (HT-SLM)." High Value Manufacturing: Advanced Research in Virtual and Rapid Prototyping—Proceedings of the 6th International Conference on Advanced Research and Rapid Prototyping. (Year: 2013).*

Das, Suman et al., "Producing Metal Parts with Selective Laser Sintering/Hot Isostatic Pressing," Journal of Metals, vol. 50, No. 12, pp. 17-20, Dec. 1, 1998.

Hagedorn, Y.-C. et al., "Processing of Nickel Based Superalloy MAR M-247 by Means of High Temperature—Selective Laser Melting (HT—SLM)," High Value Manufacturing: Advanced Research in Virtual and Rapid Prototyping, Chapter 50, pp. 291-295, Oct. 1, 2013.

German Office Action, Application No. 102015205316.4, 5 pages, dated Dec. 11, 2015.

International Search Report and Written Opinion, Application No. PCT/EP2016/055146, 22 pages, dated Jun. 14, 2016.

Chinese Office Action, Application No. 201680018190.7, 14 pages, dated Sep. 28, 2018.

* cited by examiner

POWDER-BED-BASED ADDITIVE MANUFACTURING PROCESS

CROSS-REFERENCE TO RELATED APPLICATIONS

This application is a U.S. National Stage Application of International Application No. PCT/EP2016/055146 filed Mar. 10, 2016, which designates the United States of America, and claims priority to DE Application No. 10 2015 205 316.4 filed Mar. 24, 2015, the contents of which are hereby incorporated by reference in their entirety.

TECHNICAL FIELD

The present disclosure relates to powder-bed-based additive manufacturing processes. Embodiments thereof may include methods for producing a component from a superalloy.

BACKGROUND

In known systems, there is no ability to process materials from superalloys as a powder by means of selective laser melting. In part, this is because the products produced are subject to high internal stresses, causing cracks. At least one system proposes high preheating to combat this tendency. On the other hand, it is known that powders that are intensely preheated become caked together by sintering. In selective laser melting applications, the powder bed solidifies and can become caked to the surface of the component produced. It is then no longer possible for the component produced to be detached cleanly from the powder bed. Furthermore, the powder cannot be used again if the particles become caked together. This makes the method more expensive, since raw material is regularly discarded. The caking of the powder bed may additionally have the effect that the surface of the powder bed does not remain level. This makes the application of renewed layers of powder more difficult and geometrical defects can occur on the surface of the powder bed. The quality of the components produced is impaired as a result.

SUMMARY

The teaching of the present disclosure may provide a method for producing a component from a superalloy by way of a powder-bed-based additive manufacturing process with which components that satisfy the requirements demanded of the components can be produced from superalloys. The component can be produced with great reliability at low cost.

In an example method, the component is built up layer by layer in a powder bed by melting particles forming the powder bed with an energy beam, such as for example an electron beam or a laser beam. This involves preheating the powder bed to a temperature below the melting temperature of the particles before and while the particles are melted. The method for selective laser melting that is discussed in this document is intended to be suitable for processing high-melting materials. Since there is an interest in also producing components that have a low level of internal stresses from high-melting materials, a preheating of the material powder to a temperature of at least 500° C. is provided before melting of the powder. This temperature must however still lie well below the melting point of the material of the powder.

For example, some embodiments may include a method for producing a component (19) from a superalloy by way of a powder-bed-based additive manufacturing process, in which the component (19) is built up layer by layer in a powder bed (13) by melting particles (25) forming the powder bed (13) with an energy beam (17), the powder bed (13) being preheated to a temperature below the melting temperature of the particles (25) before and while the particles (25) are melted, characterized in that a powder of which the particles (25) are coated with a ceramic layer (27) is used.

In some embodiments, the ceramic contains metals that also represent an alloying constituent of the superalloy.

In some embodiments, the alloy content of that alloying constituent of the superalloy that is also contained in the ceramic is reduced in comparison with the target alloy composition of the superalloy to the extent that, with respect to the coated particle (25), this alloying constituent reaches or exceeds the alloy content of the target alloy composition while making allowance for the amount of the metal concerned that is contained in the layer (27).

In some embodiments, the ceramic is oxidic or nitridic.

In some embodiments, the layer (27) on the particles (25) has a thickness of at least 1 nm and at most 20 nm.

In some embodiments, particles (25) with a particle size of at least 10 µm and at most 50 µm, e.g. an average particle size of 25 µm to 30 µm, are used.

In some embodiments, a nickel-based superalloy is used as the superalloy.

In some embodiments, the powder bed (13) is preheated to a temperature of at least 800° C. and at most 1000° C.

In some embodiments, the component (19) is cooled after its completion at a rate of at most 1° C./s.

In some embodiments, the ceramic is selected from the group of the following materials: aluminum oxide, titanium oxide, silicon oxide, zirconium oxide, yttrium oxide and aluminum nitride.

Some embodiments may include a component made from a superalloy, characterized in that the alloy composition of the superalloy contains oxygen or nitrogen as a proportion of the alloy.

In some embodiments, the proportion of oxygen or the proportion of nitrogen does not exceed 0.3% by volume.

In some embodiments, the proportion of oxygen or the proportion of nitrogen is at least 0.03% by volume.

BRIEF DESCRIPTION OF THE DRAWINGS

Further details of the teachings herein are described below on the basis of the drawings. The same or corresponding elements of the drawing are respectively provided with the same designations and to this extent are only explained more than once if there are differences between the individual figures. In the drawing.

DETAILED DESCRIPTION

Figure 1:
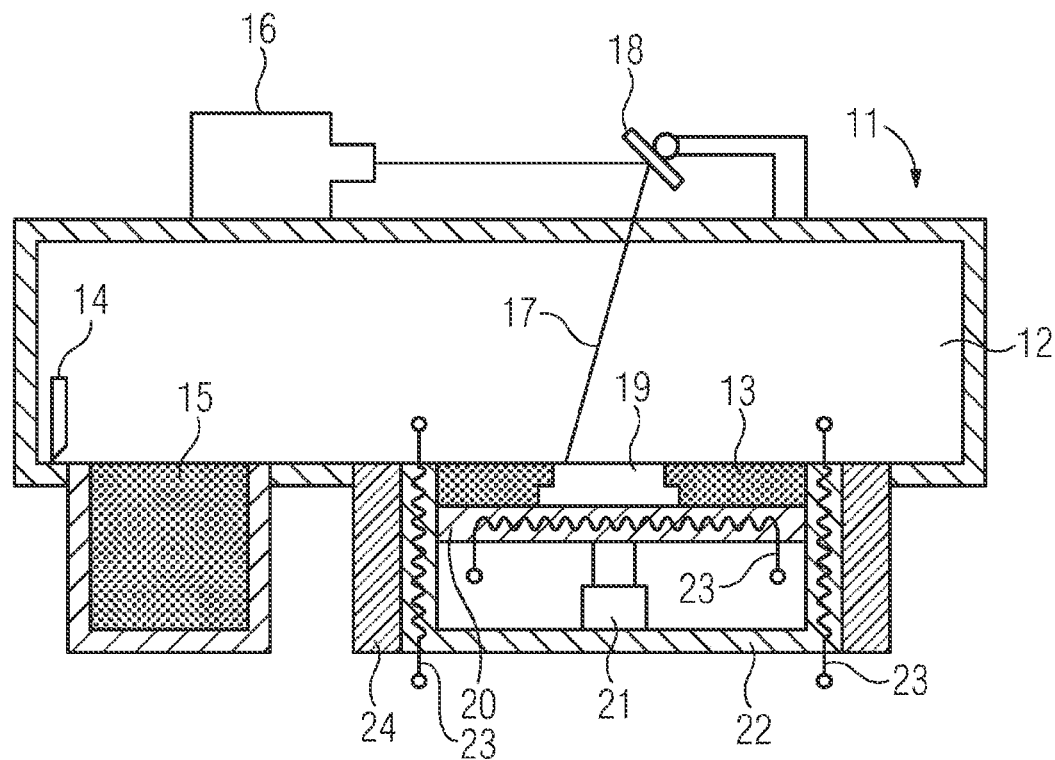
FIG. 1 shows in section a laser melting installation according to teachings of the present disclosure.

The teachings of the present disclosure may be embodied in methods using a powder with particles coated with a ceramic layer. The coating of the particles may allow them to be preheated to a higher temperature without becoming caked to adjacent particles. Ceramic materials can be heated to higher temperatures without caking together of the particles taking place. The core of the particles keep the material properties chosen on the basis of the choice of material. The ceramic layer acts as if it were a masking of these particles, so they behave like ceramic particles with regard to the question of caking due to powder preheating.

Although constituents of the ceramic layer located on the particles can become incorporated in the component during its formation, this accounts for an extremely small proportion because the layer on the particles may be a very thin layer. The layer may for example have a thickness of at least 1 nm and at most 20 nm. This is sufficient for effectively preventing caking to adjacent particles. With particle sizes of at least 10 µm and at most 50 µm, e.g. an average particle size of 25 µm to 30 µm, it is then ensured that, with respect to the overall particle material, the proportion accounted for by the ceramic turns out to be very small.

Assuming for example particles with a diameter of 30 µm are provided with a coating of 3 nm, the proportion by volume accounted for by the ceramic is only 0.06% (3×3 nm/15 µm). This allows the contaminants in the alloy that occur during the melting of the powder because the material of the coating is incorporated in the component to be reduced to a minimum.

Moreover, the very thin ceramic layer flakes off from the powder when the latter is heated until it melts. The metal alloy that forms the core of the particles expands to a greater extent under the heating than the ceramic layers. The ceramic layers also prevent adjacent particles from becoming caked together when they are detached from the core of the particles as a result of the heating of the particles. In the regions in which the particles touch one another, the remains of the layer remain between the respective particles even after detachment from the surface of the core, and thereby prevent caking.

In some embodiments, the ceramic contains metals that also represent an alloying constituent of the superalloy. These metals may disturb the composition of the alloy much less than metals that are foreign to the alloy, since they only alter insignificantly the alloying proportions in the alloy of the component produced. Foreign alloying constituents can have a greater proportionate role by comparison in changing the profile of properties of the material of the component.

In some embodiments, the alloy content in the core of the particles of that alloying constituent of the superalloy that is, as mentioned, also contained in the ceramic is reduced in comparison with the target alloy composition of the superalloy. With respect to the overall particle (including the layer), this alloying constituent may reach or exceed the alloy content of the target alloy composition of the superalloy. In other words, a compensation for a possible change in the alloy composition is counteracted by allowance for this already being made in the production of the component.

Then, during the melting of the particles, the material of the layer is taken up into the material of the component forming and replaces there the missing proportion of the alloy in the particles that was deliberately omitted to make allowance for this effect. A precondition for this measure is a sufficient diffusion capacity of the alloying constituent concerned, this diffusion capacity being predefined by the reduced cooling rate of the component as a result of the preheating.

In some embodiments, the ceramic is oxidic or nitridic. Oxygen and nitrogen as an alloying constituent in superalloys can be accepted up to a certain level without the alloy changing excessively in its profile of properties.

A nickel-based superalloy may be used as the superalloy. For example, the blades of gas turbines can be produced from these superalloys. In the case of this material, the powder may be preheated to a temperature of at least 800° C. and at most 1000° C. Furthermore, the device that introduces the heat into the powder bed for preheating that the cooling after the production of the component may perform at a rate of at most 1° C. per second. This may allow γ' precipitates of intermetallic phases that characterize the typical microstructure of the nickel-based superalloy to form in the component made from the nickel-based superalloy.

The growth of the cuboidal γ' precipitates is suppressed when cooling is too rapid. If the component is cooled slower than 1° C. per second, however, said precipitates are produced when the temperature is below the γ' solidus temperature. The solidus temperature is at 1150° C. To ensure slow cooling from this temperature level, the temperature of the powder bed must lie slightly lower. Some embodiments use a temperature level of between 900° C. and at most 1000° C.

If oxidic or nitridic ceramics are used as the layer on the particles (aluminum oxide, titanium oxide, silicon oxide, zirconium oxide, yttrium oxide and aluminum nitride are advantageous), a microstructure that contains oxygen or nitrogen or both as a proportion of the alloy then forms in the component. Such a component may be produced by selective laser melting, the powders described being used.

In some embodiments, the proportion of oxygen or the proportion of nitrogen does not exceed 0.3% by volume, e.g. 0.1% by volume. On the one hand the layer on the particles can have a sufficient thickness to develop its effect. On the other hand, the resultant proportion of nitrogen or oxygen is nevertheless so low that it does not have an adverse effect on the alloy of the component.

In some embodiments, the proportion of oxygen or the proportion of nitrogen is at least 0.03% by volume, in order that the ceramic layer on the particles can be of a sufficient thickness.

In FIG. 1, an installation 11 for laser melting is schematically shown. This has a process chamber 12, in which a powder bed 13 can be produced. For producing a layer of the powder bed 13, a distributing device in the form of a doctor blade 14 is moved over a powder supply 15 and subsequently over the powder bed 13, whereby a thin layer of powder is produced in the powder bed 13. A laser 16 then generates a laser beam 17, which is moved over the surface of the powder bed 13 by means of an optical deflecting device with a mirror 18. The powder is thereby melted at the point of impingement of the laser beam 17, whereby a component 19 is produced.

The powder bed 13 is produced on a building platform 20, which can be lowered step by step, by the thickness of a powder layer in each case, in a pot-shaped housing 22 by way of an actuator 21. In the housing 22 and the building platform 20, heating devices 23 are provided, e.g. electrical resistance heaters, which can preheat the component 19 being produced and the particles of the powder bed 13. To limit the energy requirement for the preheating, on the outside of the housing 22 there is an insulation 24 with low thermal conductivity.

Figure 2:
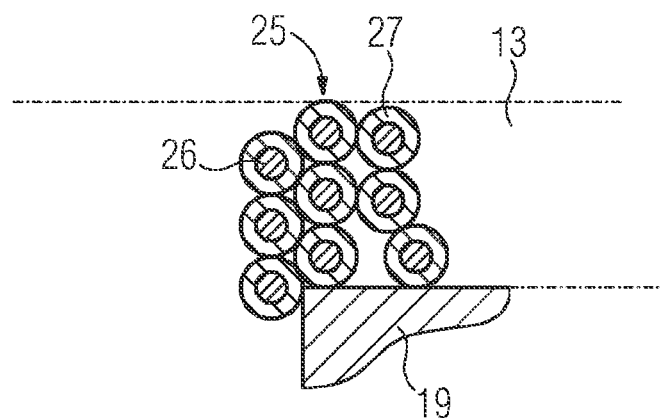
FIGS. 2 to 4 show selected steps when carrying out the method according to FIG. 1, a small detail of the component that is being produced being shown in section.

Shown in FIG. 2 is an edge of the component 19 to be produced, which for example could be produced in an installation according to FIG. 1. This component is in the powder bed 13, the borders of which are indicated by a dash-dotted line. Selected particles 25 from the powder bed 13, which consist of the material of a nickel-based alloy, are also shown. The component to be produced may for example be a turbine blade.

The particles consist in each case of a core 26, which consists of the actual material of the component 19, e.g. a nickel-based alloy. The core 26 of the particles 19 is also surrounded by a layer 27, which in each case completely coats the core and consists of aluminum oxide. This makes it possible for the powder bed to be preheated up to 1000° C. without adjacent particles 25 becoming caked together.

Figure 3:
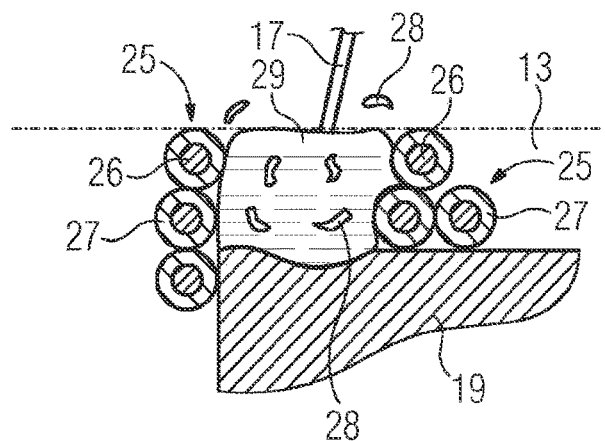

It is shown in FIG. 3 how part of the powder bed 13 is melted by means of the laser beam 17, to be specific the part that lies at the edge of the component 19. The cores 26 of the particles 25 thereby melt. Before melting occurs however, the cores 26, which consist of a metallic material, expand. The layer 27 thereby flakes off partially from the cores 26, fragments of the layer 28 that are produced as a result remaining in the melted material and breaking up there (alloy formation). However, some of the fragments of the layer 28 are blown off to such an extent that they remain outside the melt bath 29 formed by the laser beam 17.

Figure 4:
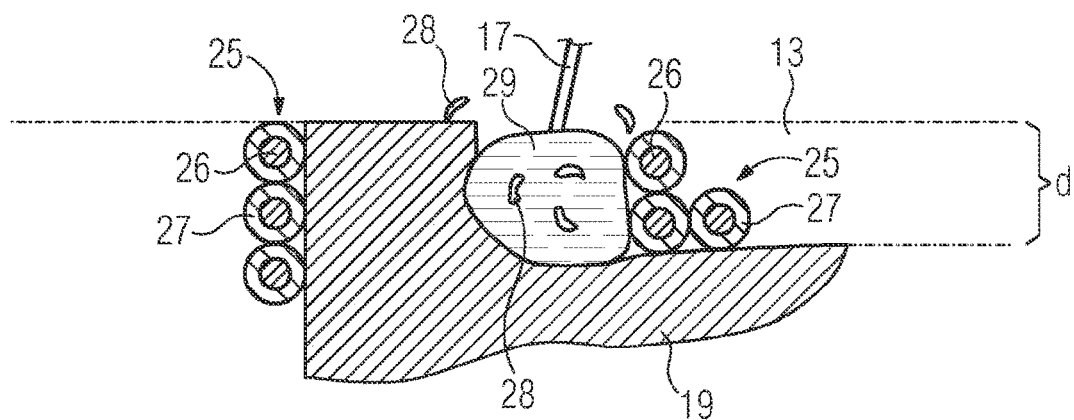

It can be seen in FIG. 4 how the laser 17 is moved over the powder bed 13, the melt bath traveling from the left to the right, as shown in FIG. 4. As it does so, a layer of the component 19 to be produced that corresponds to the layer thickness d of the powder bed is formed. If the laser beam 17 travels further, the material solidifies, with simultaneous formation of the volume of the component. The heating indicated in FIG. 1 brings about the effect that the cooling rate of the material of the component 19 being produced is less than 1° C. per second.

Figure 5:
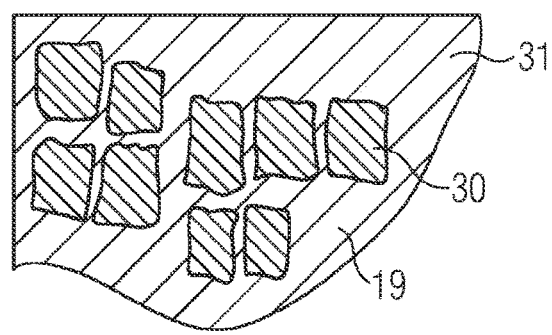
FIG. 5 shows a detail of an exemplary embodiment of the component according to the teachings of the present disclosure produced according to FIGS. 2 to 4.

In FIG. 5, the completed component can be seen. This is schematically shown as a micrograph. The material from which the component 19 is produced is a nickel-based superalloy. The controlled cooling rate has successfully had the effect that a high proportion of so-called γ' precipitates 30 of intermetallic phases are achieved. These are embedded in a matrix 31 of the component. Consequently, a component microstructure such as could previously only be produced according to the prior art by casting, for example of turbine blades, can be achieved by means of the selective laser melting according to the teachings herein.

What is claimed is:

1. A method for producing a component comprising a superalloy, the method comprising:
   preheating a powder bed comprising particles, wherein each particle comprise a core material coated by a ceramic layer, the core material including alloying constituents of the superalloy;
   wherein the powder bed is heated to a temperature below a melting point of the core material; and
   building up the component layer by layer in a powder bed by melting particles with an energy beam;
   wherein the superalloy is defined by a target alloy constituent composition for each respective alloying constituent.

2. The method as claimed in claim 1, wherein the ceramic layer contains metals comprising an alloying constituent of the superalloy.

3. The method as claimed in claim 2, wherein an alloy constituent content of the core material is below the target alloy constituent composition and an alloy constituent content of the ceramic layer is above the target alloy constituent composition by a corresponding amount.

4. The method as claimed in claim 1, wherein the ceramic layer comprises an oxidic or nitridic ceramic.

5. The method as claimed in claim 1, wherein the ceramic layer has a thickness of at least 1 nm and at most 20 nm.

6. The method as claimed in claim 1, wherein the particles in the powder bed have a particle size of at least 10 μm and at most 50 μm.

7. The method as claimed in claim 1, wherein the superalloy comprises a nickel-based superalloy.

8. The method as claimed in claim 7, wherein the temperature of the powder bed is at least 800° C. and at most 1000° C.

9. The method as claimed in claim 7, further comprising cooling the component at a rate of at most 1° C. / s.

10. The method as claimed in claim 1, wherein the ceramic is selected from the group consisting of: aluminum oxide, titanium oxide, silicon oxide, zirconium oxide, yttrium oxide, and aluminum nitride.

* * * * *